United States Patent [19]

Nelson

[11] 4,106,978

[45] Aug. 15, 1978

[54] METHOD OF PREVENTING EXPLOSIONS USING A SMELT WATER EXPLOSION INHIBITOR

[75] Inventor: Hugh Wharton Nelson, West Hartford, Conn.

[73] Assignee: Combustion Engineering, Inc., Windsor, Conn.

[21] Appl. No.: 764,116

[22] Filed: Jan. 31, 1977

[51] Int. Cl.² .............................................. D21C 11/12
[52] U.S. Cl. .......................................... 162/1; 75/92; 162/30 K; 162/30 R; 162/49; 423/DIG. 3; 428/405
[58] Field of Search ..................... 162/30 K, 30 R, 49, 162/1; 427/404, 405, 220, 221; 428/405; 423/207, DIG. 3; 75/92

[56] References Cited

U.S. PATENT DOCUMENTS

| 3,447,895 | 6/1969 | Nelson et al. | 162/30 K |
|---|---|---|---|
| 3,615,175 | 10/1971 | Nelson | 162/30 K |
| 3,873,413 | 3/1975 | Fisher | 162/30 R |
| 3,963,627 | 6/1976 | Cottrell | 428/405 |

OTHER PUBLICATIONS

Nelson; "A New Theory to Explain Physical Explosions" Tappi; Mar. 1973, vol. 56, No. 3, pp. 121–125.
Nelson et al., "What Causes Kraft Dissolving Tank Explosions" Paper Trade Journal; Jul. 16, 1956, pp. 50–56.
Advisory Technical Committee Smelt-Water Research Group; pp. 51A–55A, "Research on Smelt Water Reactions"; Tappi; Dec. 1966, vol. 49, No. 12.

*Primary Examiner*—S. Leon Bashore
*Assistant Examiner*—Steve Alvo
*Attorney, Agent, or Firm*—Richard H. Berneike

[57] ABSTRACT

A method of preventing a physical explosion caused by the contact of water with a molten material such as molten smelt and molten metal by the addition of a porous, high surface area powder which is coated with an anti-wetting agent. The material sinks through the water layer to the interface between the water and the molten material carrying air or gas bubbles with it. The invention is particularly applicable to smelt-water explosion in kraft chemical recovery furnaces.

3 Claims, No Drawings

METHOD OF PREVENTING EXPLOSIONS USING A SMELT WATER EXPLOSION INHIBITOR

BACKGROUND OF THE INVENTION

Due to serious explosions which have occurred in kraft chemical recovery furnaces, studies have been conducted in order to analyze the mechanics of these explosions with a view toward developing methods by which they can be prevented. These studies indicate that violent noncombustible physical explosions can result when a quantity of water or water solution of chemicals contacts the molten kraft smelt which collects on and drains from the furnace floor. The water may become available for such explosive interaction with the molten smelt under conditions such as might result from a tube leak. These same physical explosions can occur upon contact between a molten metal and water.

Although the present invention is not to be limited by any particular theory for the cause of the physical explosions of the smelt-water reaction type, one possible explanation for this type of explosion is suggested in "A New Theory To Explain Physical Explosions" by Wharton Nelson, TAPPI, March 1973, Vol. 56, No. 3, pp 121–125. This theory indicates that the initial steam film forming on molten smelt contact with liquid water soon collapses and is replaced by a thin shell of superheated water. High superheat is possible since liquid-liquid surface contact presents few nucleation sites. This thin layer reaches its limit of superheat and spontaneously explodes; i.e., converts to steam. This sharp but weak triggering (blasting cap-like) explosion causes an extremely rapid heat transfer due to the finely divided molten smelt particles created which are now traveling at high velocity through bulk liquid water. These ideal heat transfer conditions result in large volumes of water being rapidly converted to steam with a consequent 1700-fold multiplication of volume upon phase change.

This sudden creation of gas (steam) constitutes a physical explosion phenomenon which occurs only when two liquid materials at widely different temperatures contact each other. Physical type explosions contrast with the combustible type of explosion which produces rapidly expanding gases by a highly exothermic chemical reaction. Since the two explosion causing mechanisms are different, prevention methods would necessarily be different also. For example, while merely inerting a furnace atmosphere with gases such as water vapor and/or carbon dioxide would prevent a combustible explosion, such a technique would not counteract a physical explosion which can occur under water or in a 100 percent nitrogen atmosphere. Several different techniques have been developed for preventing such explosions including those described in U.S. Pat. Nos. 3,447,895 and 3,615,175.

SUMMARY OF THE INVENTION

The present invention involves a technique for preventing smelt-water explosions by nucleating the thin initial superheated water layer. This nucleation causes the superheated water to release steam gradually and non-violently rather than explosively; i.e., it prevents the formation of a blasting-cap-like interfacial layer of superheated water. This is accomplished in the present invention and by the use of a porous solid material which is treated to be hydrophobic and in which the pores are filled with a gas which produces bubbles and nucleation.

DESCRIPTION OF THE PREFERRED EMBODIMENT

The present invention is applicable to any situation where there is the possibility of a physical explosion caused by water contacting a high temperature molten material. This includes molten metals as well as molten salts and other molten chemicals. Although, the invention will be described as it specifically relates to the molten kraft smelt in a chemical recovery furnace, it is to be understood that the invention is not so limited.

A peculiar phenomenon of physical explosions of the molten smelt-liquid water reaction type is that such explosions only occur, if they occur at all, after a considerable amount of time has elapsed from accidental water injected into the furnace. This delay may be due to adjustment of smelt temperature (kraft smelt only reacted explosively when the temperature thereof was between its approximate freezing temperature of 1425° F and about 1725° F), dissolved smelt content of the water, or mixing geometry, all of which strongly influence physical explosions. Because of this considerable time delay, it is possible to detect the water injection into the furnace and onto the molten smelt and inject into the furnace materials which will prevent a smelt-water explosion.

The novel method of this invention involves the injection into the furnace of a porous, high surface area powder which is treated to be hydrophobic and which is more dense than water. The anti-explosive additive sinks through the water and down to the interface between the water and the molten smelt where the layer of superheated water normally forms. Some members of the class of the porous solid materials suitable for the present invention include diatomaceous earth, bentonite, kaolin, silica gel, pyrogenic silica, talc and synthetic calcium and magnesium silicate prepared from diatomaceous earth. All of these porous powders are available commercially. The porous powder is treated to make it hydrophobic or water-repellent with any suitable anti-wetting agent. For example, a solution of a silicone anti-wetting agent is coated on the powder and the solvent is then permitted to evaporate. This leaves the powder and the pores therein coated with the anti-wetting agent. There are many commercially available anti-wetting agents available and suitable for this purpose. Some commercial products are Dow Corning 1107 Fluid, Dow Corning 772 Water Repellent, Union Carbide C25 Silicone Water Repellent and Union Carbide C27 Silicone Water Repellent. These materials are only illustrative and the selection of an anti-wetting agent is well within the skill of the art.

When the powder is injected into the furnace and onto the water which has accumulated on the smelt bed, the powder will sink down through the water layer. Because the powder has been coated with the anti-wetting agent, the water will not wet the powder nor will it force the gas (air) out of the pores. Therefore, the gas in the pores will be carried through the water layer with the powder. This trapped gas will thus be available to form nucleating sites to prevent the explosions as previously indicated. The amount of powder which is spread onto the smelt-water will depend on the properties of the particular smelt-water system but it should generally be enough to spread over the entire smelt-water bed and sink through the water to form a layer at the interface which is on the order of 0.15 to 0.3 centimeter thick. The material may be introduced by any desired method but preferably by a method which will generally uniformly spread the material over the entire smelt-water bed.

What is claimed is:

1. A method of preventing explosions due to water contacting a smelt and forming a layer of water thereon comprising spreading over substantially the entire smelt-water bed a layer of a porous, high surface area powder which is coated with an anti-wetting agent and wherein said porous power contains trapped air and which is more dense than water such that said powder will sink through said water layer without releasing gas and forming a layer at the interface of said water and said smelt which is at least about 0.15 centimeters thick and said air after passing through the water layer is available for forming nucleating sites.

2. A method as recited in claim 1 wherein said powder is selected from the group consisting of diatomaceous earth, bentonite, kaolin, silica gel, pyrogenic silica, talc, calcium silicate, magnesium silicate and aluminum oxide.

3. A method of preventing a smelt-water explosion due to a water leak in a chemical recovery furnace containing molten kraft smelt with a layer of said water thereon comprising the steps of detecting said water leak and spreading over substantially the entire smelt-water bed a layer of a porous, high surface area powder which is coated with an anti-wetting agent and wherein said porous powder contains trapped air and which is more dense than water such that said powder will sink through said water layer without releasing gas and forming a layer at the interface of said water and said smelt which is at least about 0.15 centimeters thick and said air after passing through the water layer is available for forming nucleating sites.

* * * * *